United States Patent [19]

Yonezawa et al.

[11] 4,320,215
[45] Mar. 16, 1982

[54] POLYMERIZATION OF VINYL CHLORIDE WITH PHENOLIC COMPOUNDS

[75] Inventors: Kazuya Yonezawa; Tadashi Osawa, both of Kobe, Japan

[73] Assignee: Kanegafuchi Kagaku Kogyo Kabushiki Kaisha, Osaka, Japan

[21] Appl. No.: 91,969

[22] Filed: Nov. 7, 1979

Related U.S. Application Data

[63] Continuation of Ser. No. 841,297, Oct. 12, 1977, abandoned.

[30] Foreign Application Priority Data

Oct. 12, 1976 [JP] Japan ............................. 51-122696
Apr. 18, 1977 [JP] Japan ............................. 52-44907
Aug. 26, 1977 [JP] Japan ............................. 52-102852

[51] Int. Cl.$^3$ ........................... C08F 2/20; C08F 2/24; C08F 2/02
[52] U.S. Cl. ................................. 526/62; 526/202; 526/225; 560/55; 568/33; 568/707; 568/727; 562/468
[58] Field of Search ........................................... 526/62

[56] References Cited

U.S. PATENT DOCUMENTS 3,825,434 7/1974 Berens ................................. 427/230
4,076,951 2/1978 Katayvma ............................ 526/62
4,093,787 6/1978 Burgess ............................... 526/62

Primary Examiner—C. A. Henderson
Attorney, Agent, or Firm—Moonray Kojima

[57] ABSTRACT

A method of preventing scale formation and adhesion onto the surfaces of a polymerization vessel and auxilliary equipment used in polymerization of vinyl chloride monomer, wherein the surfaces are coated prior to polymerization with a coating agent having the concurrent properties of (a) one or more functional groups having the ability to chelate, (b) one or more functional groups having the ability to inhibit action of free radicals, and (c) substantial insolubility to vinyl chloride monomer and insoluble to water. The concurrent presences of these functional characteristics syngergistically act to prevent scale adhesion onto the surfaces after substantial numbers of repeated polymerization charges.

10 Claims, No Drawings

POLYMERIZATION OF VINYL CHLORIDE WITH PHENOLIC COMPOUNDS

This is a continuation of application Ser. No. 841,297, filed Oct. 12, 1977, now abandoned.

BACKGROUND OF THE INVENTION

This invention relates to a method of polymerizing vinyl chloride monomers, and more particularly to such a method wherein polymerization scales are prevented from adhering onto the surfaces of a polymerization vessel and associated equipment used in the polymerization of vinyl chloride monomers. The term "vinyl chloride monomer" will be used herein to mean vinyl chloride used alone, or a mixture of monomers comprising a major proportion of vinyl chloride and a minor proportion of other monomers copolymerizable with vinyl chloride, unless, of course, by the context such term has another meaning.

In suspension polymerization of vinyl chloride monomer in an aqueous medium, in the presence of a dispersing agent and an oil-soluble catalyst; or in an emulsion polymerization of vinyl chloride monomer in the presence of an emulsifier and a water soluble catalyst; or in a bulk polymerization of vinyl chloride monomer, polymer scales had always formed and adhered to the inner surfaces of the polymerization vessel and associated equipment used therewith, in prior art processes.

Polymer scale formation and adherance causes many disadvantages and deficiencies, such as decrease of thermal efficiency due to decrease in thermal conductivity, decrease in yield, decrease in quality of the product formed because of the mixing of the scales which may have become separated from the inner surfaces with the product, and decrease in operating efficiency of the equipment due to the added time required to remove the scales before the polymerization of the next charge.

In the prior art, many different proposals have been made to eliminate or reduce the above deficiencies and disadvantages. However, none of the prior art has been satisfactory from a practical standpoint.

For example, one proposed prior solution, as disclosed in Japanese Pat. No. 1970-30,343, is to coat the inner surfaces with a compound comprising a nitrogen containing organic compound selected from a group of organic compounds having azo group, nitro group, nitroso group, azomethin group or azine group and amino compounds; a sulfur containing organic compounds selected from a group of organic compounds having thio-carbonyl group, thio-ether group or thio-alcohol group, quinones, ketones, aldehydes and carboxylic acids which have more than six carbon atoms. However, experiments have shown that the various practical compounds shown in the specification of this patent have only a small effect on prevention of scale formation, and hence are not satisfactory from a practical standpoint.

Another example is Japanese Pat. No. 1970-30,835 which discloses a method of coating the inner surfaces of the polymerization vessel with a dye or pigment. However, this method is not satisfactory since the dye or pigment would tend to contaminate the product.

A still further example is Japanese Unexamined Pat. No. 1973-44,375, which discloses coating the inner surfaces with an inhibitor of free radicals. Alpha methyl styrene is disclosed to have a marked effect, among various free radical inhibitors. However, in contrast to the disclosed results, the present inventors have run tests and discovered that coatings of alpha methyl styrene has no appreciable effect on prevention of scale formation and adhesion.

Moreover, in Japanese patent application Ser. No. 1975-147,863, by the present inventors, the inner surfaces are coated by using pyrogallol or hydroxyhydroquinone. But, these compounds do not always effectively prevent polymer scale formation without being infuenced by other factors, such as polymerization temperature, and order of charging of the starting material, since they are water soluble. Also, the presence of an emulsifier tended to affect the ability of pyrogallol and hydroxyquinone to prevent polymer scale adhesion.

SUMMARY OF THE INVENTION

It is an object of this invention to eliminate the foregoing and other deficiencies and disadvantages of the prior art.

Another object is to provide a method of polymerization of vinyl chloride monomer, wherein a coating is provided to the inner surfaces of the polymerization vessel and associated equipment used in such polymerization, to prevent formation and adhesion of polymer scales, for repeated charges of polymerizations.

This invention is directed to a method of polymerizing vinyl chloride monomer, wherein a novel coating agent is used to coat the inner surfaces of the polymerization vessel and associated equipment used in the polymerization of vinyl chloride monomer, to prevent polymer scale formation and adhesion for a substantial number of repeated polymerization charges. The coating agent has the combination of the following functional abilities, which together, by synergistic effect, prevent polymer scale formation and adhesion on the inner surfaces for a substantial number of repeated polymerization charges. The coating agent of this invention must (a) have the ability to chelate, or in other words, the compound should have one or more functional groups to chelate,
(b) have the ability to inhibit free radicals, or in other words, the compound should have at least one functional group to inhibit the action of free radicals, that is to inhibit radical polymerization; and
(c) be substantially insoluble to vinyl chloride monomer, and be substantially insoluble to the aqueous component of the aqueous medium used in the polymerization system at a given polymerization condition.

It was discovered that if any one of the above three conditions were not present, then no appreciable effect in preventing polymer scaling, was obtained, or if such effect were obtained, it would be at an early stage of polymerization or for only few charges, and would not be long lasting.

The coating agents, which satisfy the above conditions are given by chemical formula hereinbelow and in the detailed description for the sake of not repeating and confusing the formulas.

Advantageously, the inventive coating agent, by syngergistic effect, prevents formation and adhesion of polymer scales, even after substantialy number of repeated polymerization charges in the same vessel. By this invention, a substantial advance has been made in the art. The commercial significance of this method cannot be overestimated; for example, consider the expense and time saved if instead of two charges of polymerization being done before cleaning of the adhered polymer scales, it is possible, as with the present invention, to run ten charges before cleaning is required.

A feature of the invention is a coating agent used to prevent polymer scale formation and adhesion onto the inner surfaces of the polymerization vessel and associated equipment used in a process of polymerizing vinyl chloride monomer, which inventive coating agent has the following combined properties: (a) ability to chelate; (b) ability to inhibit free radical action; and (c) insoluble to vinyl chloride monomer and insoluble to the aqueous medium used.

Another feature is the use of a coating agent in an amount of from 0.001 g/m² to 5 g/m².

A further feature is the dissolving of the coating agent in a solvent, or diluting with a diluent or the suspending in water, prior to coating onto the inner surfaces of the polymerization vessel and associated equipment.

Another feature is that the inventive coating agent has the chemical formula:

A—R—B wherein, A is shown by the formula

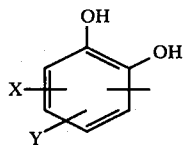

wherein X is —H, or —OH, and Y is a member selected from the group consisting of —H, —OH, —NH₂,

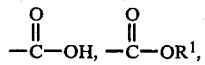

—SO₃H, halogen, alkyl radical and alcoxyl radical; B is a member of aryl radicals or substituted aryl radicals having 6 to 18 carbon atoms, and R is a divalent organic radical.

A further feature is a compound of the formula

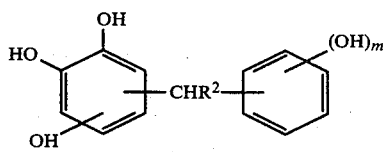

wherein R² is a member selected from the group consisting of alkyl radicals, aryl radicals and aralkyl radicals having from 1 to 18 carbon atoms and m is an integer of 1,2 or 3, and wherein when m is 3,

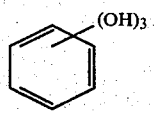

is pyrogallol or hydroxyhydroquinone.

Other features of different specific compounds and formula are discussed in more detail hereinbelow. The above features are only illustrative and are not limiting in any way.

DETAILED DESCRIPTION OF PREFERRED EMBODIMENTS

The vinyl chloride monomer, as above stated, may be vinyl chloride used alone, or a mixture of monomers, the major proportion being vinyl chloride and a minor proportion of other monomers copolymerizable therewith. Examples of such copolymerizable monomers are vinyl acetate, vinyl propionate, methyl vinyl ether, methyl acrylate, butyl acrylate, methyl methacrylate, maleic acid, ethylene propylene, vinylidene chloride, vinyl fluoride and acrylonitrile.

The coating agent must have the combined abilities as above discussed. Each of these will now be discussed in more detail.

(a) The functional ability to chelate. The ability to chelate makes it possible for the coating agent to adhere tightly to the inner surfaces of the polymerization vessel and accessories used therewith, such as propellers, agitators, etc. This enables the coating agent to be operative for a long period of time, much longer than for any coating agent known in the art. For example, this inventive coating lasted for 10 charges of polymerization without any polymer scales being formed, whereas, the prior art coatings lasted an average of two charges before substantial scale build up was encountered which made necessary shutting down and cleaning of the built up scales.

The following are examples of functional groups which have the ability to chelate:

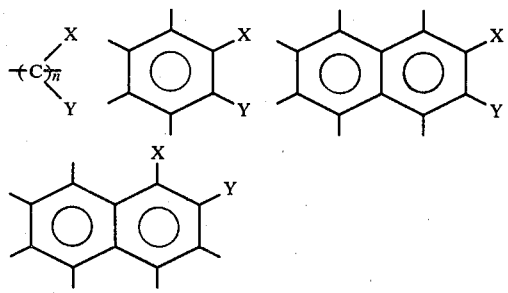

wherein n is an integer, such as 2-4, and X and Y are functional groups such as —O—, —N, —P, —As, —CO₂⊖, =NCS₂⊖ and

In case of aliphatic chain, such as shown in the above general formula, the number of carbon atoms is between 2-4, and X and Y are oxygen, nitrogen, phosphorus, sulphur, arsenic, carboxylic group, dithio-carboxylic group, carbonyl group or conjugated basic groups to those groups.

Furthermore, in case of aromatic series, such as shown in the above general formula, it is necessary that they be ortho-derivatives, wherein X and Y are the same as those of the aliphatic chains. The necessity of the existence of two functional groups in the orthoposition will be explained hereinbelow with a typical practical example. Among the following three isomers:

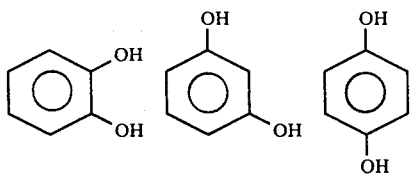

only catechol has the ability to prevent formation of scale adhesion. Resorcinol and hydroquinone have no such ability to prevent scale adhesion. Furthermore, in case of the following isomers having three hydroxyl groups on a benzene ring, pyrogallol and hydroxygydroquinone have remarkable effect on the prevent of scale adhesion. However, 1,3,5-trihydroxybenzene has no such efect:

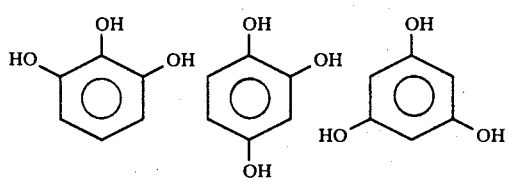

(b) The ability to inhibit action of free radicals. Examples of the functional group having an ability to inhibit the action of free radicals are phenols, N-aromatic compound substituted phenyl amines, dithio-carbamates, tertiary amine-N-oxides, etc. Of course, it is desirable that the functional group which has an ability to inhibit action of free radicals co-exist with the function group which has the ability to form a chelated structure with for example a metallic ion, in a molecule. Thus, a molecule having the aforementioned two functional abilities, concurrently, has a large effect on preventing scale formation and adhesion. However, as will be discussed again, the third element must still be concurrently satisfied in order for the invention to be optimally effective and long lasting.

It was found that when polymerization of vinyl chloride monomer was carried out with the inner surfaces of the vessel coated with polypropylene oxide containing such structures as easily decompose to free radicals, such as disulfide linkage and tertiary carbon structure, which is soluble to vinyl chloride and to water, the amount of polymer scales adhered to the inner surfaces considerably increased. When the disulfide linkage is decomposed to free radicals, they react to polymerize the vinyl chloride monomer at the inner surfaces of the vessel and accessories. The amount of scales increased.

Furthermore, when polyalkylene oxide having tertiary carbon units, was used as a coating agent, the same phenomenon was observed. Adhered polymer scales increased. This may be attributed to the fact that any hydrogen atom belonging to the tertiary carbon atom is easily abstracted by a free radical initiator for the polymerization of vinyl chloride and the polymerization of vinyl chlorideide at the inner surfaces of the vessel and accessories, is accelerated by free radical generated from the alkylene oxide. These observations tend to support the proposition that the polymerization of vinyl chloride at the inner surfaces of the vessel and accesories using free radical initiators, results in the formation of adhered scales by accumulation thereat of polymer.

(c) Although a compound which has the concurrent functions of ability to chelate and of ability to inhibit action of free radicals is effecting in preventing polymer scale adhesion, for optimal effects, the coating agent must also be insoluble to vinyl chloride monomer, and insoluble to the aqueous medium, such as water. For example, it was found that although pyrogallol has a protective ability to prevent scale adhesion in the earlier stages of polymerization, pyrogallic acid which has a carboxylic acid group and accordingly, is hydrophilic, has no effect on the prevention of scale adhesion during later stages of polymerization.

On the other hand, it can be pointed out that the following compounds which can be prepared by the condensation of pyrogallol, hydroxyhydroquinone, salicyclic acid, p-hydroxybenzoic acid, individually, or as a mixture of two or more thereof, with formaldehyde or benzaldehyde, or resins having dimethylcarbamate groups, are all together, substantially insoluble in water and also insoluble to vinyl chloride monomers, and hence, in our invention, has a surprising effect on prevention of formation and adhesion of polymer scales, for a relatively long time, that is to say that a substantial number of repeated polymerization charges can be carried out without cleaning the inner surfaces, without exception.

The expression substantially insoluble in water and vinyl chloride monomers, means that in numerical terms, the solubility is less than 1 g to 100 g of any one of them, or preferably, less than 0.5 g. Many different compounds have been discovered to satisfy the above three conditions.

It is preferred to use a compound having the following formula because of the surprising effects caused thereby in preventing polymer scale formation and adhesion for a long time. The formula is

wherein A is shown by the formula

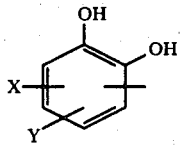

wherein X is —H, or —OH, and Y is a member such as —H, —OH, —NH₂,

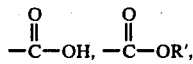

—SO₃H, halogen, alkyl radical or alcoxy radical,
B is a member of aryl radicals or substituted aryl radicals having 6 to 18 carbon atoms, and
R is a divalent organic radical.

The most preferable composition to be employed in the invention has the following formula:

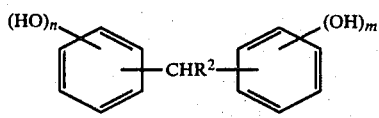

wherein n is an integer of 2 or 3, m is an integer of 1,2 or 3, R² is a divalent hydrocarbon radical having 1 to 30 carbon atoms or hydrogen and at least two OH radicals reside on adjacent carbon atoms. Especially, when n is 3, m is 2 or 3, exceptionally surprising results can be obtained.

The above compound can be prepared by condensation reaction of

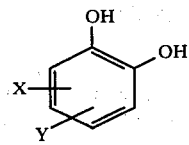

such as pyrogallol, 1.2.4 hydroxyhydroquinone or catecol, and aryl- or substituted aryl compound such as mono-, di or trivalent phenol, alkyl substituted phenol, salicilic acid, with aldehyde in an aqueous medium retained at an acidic condition.

As the aldehyde, various aldehydes can be selected, for example, aliphatic aldehydes, such as decyl aldehyde, formaldehyde, etc, and aromatic aldehydes, such as various derivatives of benzaldehyde having methyl group, ethyl group, etc. Among them, for the purpose of this invention, aromatic aldehydes are desirable. Furthermore, the costs of such derivatives of benzaldehyde are relatively inexpensive generally, and makes it advantageous to use them for the purpose of the present invention. The amount of aldehyde used in the condensation reaction is, for example, 0.1–1 mol to 1 mol of pyrogallol, or preferably, it is 0.5 to 0.7 mol to 1 mol of the latter, since in such a condition, the yield of the condensation product as the dimer of pyrogallol as shown in the above is high. The following structure results when the condensation reaction is carried out among pyrogallols and/or hydroxyhydroquinone; and of course, pyrogallol or hydroxyhydroquinone can be replaced by at least one of the substituted phenols:

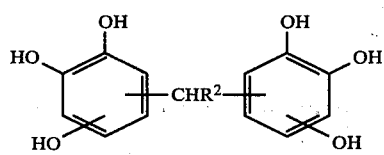

Furthermore, the following compounds are practical examples belonging to the same series of the condensation product explained above:

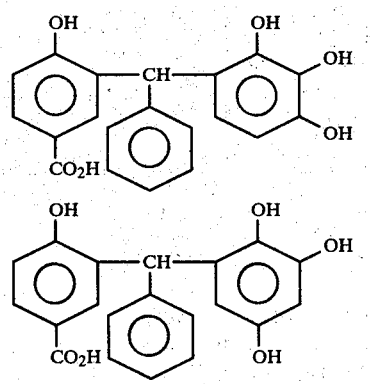

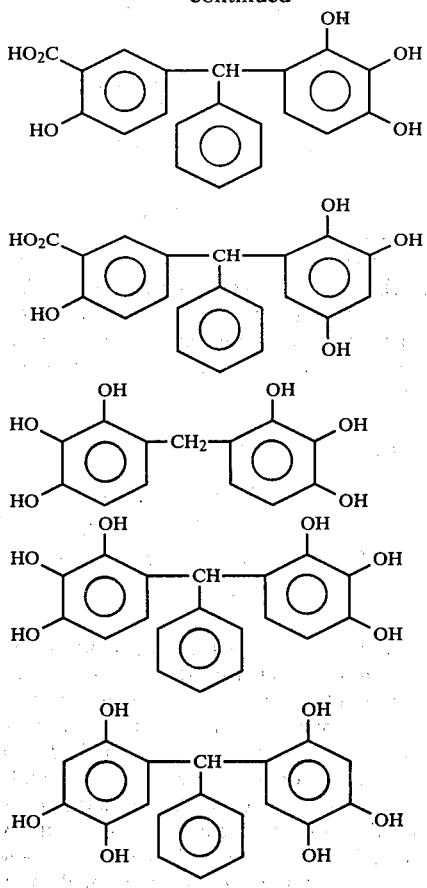

The coating agent, which satisfies the necessary conditions (a) (b) (c) discussed above, and which is coated onto the inner surfaces of the polymerization vessel and accessories may be first dissolved in a suitable solvent, or suspended in water, or diluted with a suitable diluent. No particular solvent need be specified; however, one or more in mixture of the following have been found to be satisfactory: tetrahydrofuran, dioxane, methanol, ethanol, acetone, dimethylformamide, dimethylsulfoxide, chloroform, 1,1,1-trichloroethane, etc.

The amount of coating agent to be used is preferably within the range of 0.001 to 5 g/m$^2$ of surface area to be coated ordinarily. However, an amount of more than 5 g/m$^2$ can be used if such is desired and there was found to be no undesirable effects; however, use of such larger amounts must be governed by cost of the added material.

Polymerization is conducted according to known techniques for suspension polymerization, emulsion polymerization and bulk polymerization, with the use of conventional materials, such as for example, free radical initiators, soaps, emulsifiers, different types of modifiers, and the like, such as for example disclosed in U.S. Pat. No. 3,959,234 and others.

The present invention will now be further illustrated with actual examples, which are not to be construed in any limiting manner. In the following examples, Examples 1 through 5 illustrate the method of manufacturing condensation reaction products which are then used in succeeding examples 6 through 14.

EXAMPLE 1

At first, 478 g (3 mols) of pyrogallol was dissolved into 2 liters of water. Then 212 g (2 mol) of benzaldehyde and 588 g (6 mols) of phosphoric acid were added into the obtained solution of pyrogallol. A condensation reaction between them was carried out at 100° C. for 4 hours. The condensation product, which is insoluble in water, was separated from the aqueous medium and precipitated. The obtained solid matter was washed with hot water for 3 to 5 times until the filtrate became neutral. After drying the solid matter at 100° C. under vacuum, 637 g of the condensation product having the following formula was obtained:

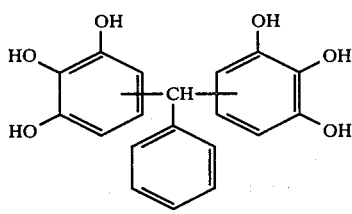

The yield of condensation product was 91%. The product was analyzed with the following results:

Infra-red absorption spectra: 3400 cm$^{-1}$ (due to existence of OH bond); 760 cm$^{-1}$ and 695 cm$^{-1}$ (mono-substituted benzene ring); 810 cm$^{-1}$ (tetra-substiuted benzene ring)

Elemental analysis: calculated: C 67.06%, H 4.71%; Observed: C 67.42%, H 4.78%.

In place of phosphoric acid in Example 1, two experiments were carried out, using hydrochloric acid and sulphuric acid, respectively, and using the same conditions as in Example 1. The yields of the obtained condensation product were 85% and 56%, respectively.

EXAMPLE 2

In place of the benzaldehyde of Example 1, an experiment was carried out using decyl aldehyde, and using the same conditions as in Example 1. A condensation product whose formula is given below was obtained in an amount of 860 grams, corresponding to 46% yield:

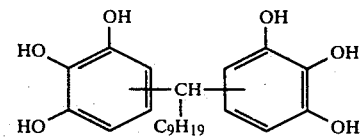

The product was analysized with the following results:

Infrared absorption spectra: 3400 cm$^{-1}$ (existence of OH bond); 815 cm$^{-1}$ (tetra-substituted benzene ring)

EXAMPLE 3

An aqueous solution containing 0.1 mol of pyrogallol and 0.1 mol of formaldehyde was added into 200 g of aqueous solution containing 50 weight % of phosphoric acid. A condensation reaction was carried out at 60° C. for 1 hour and then a reaction product, was precipitated. The obtained product, after separating and washing with water, was observed to have the following formula:

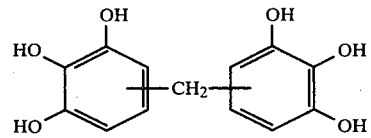

EXAMPLE 4

239 g (1.5 mols) of pyrogallol and 210 g (1.5 mol) of 4-methoxy pyrocatecol were dissolved into 2 liter of water. Then, 212 g (2 mols) of benzaldehyde and 588 (6 mols) of phosphoric acid were added into the obtained solution. A condensation reaction between them was carried out at 100° C. for 4 hours. The condensation product, which was insoluble in water, was separated from the aqueous medium and precipitated. The obtained product was washed with hot water. After drying the solid matter at 100° C. under vacuum, 345 g of the condensation product was obtained. The main component of the product is shown by the formula below. Minor components which were the condensation product of 4-methoxy pyrocatecol with benzaldehyde and of pyrogallol with benzaldehyde were also contained therein.

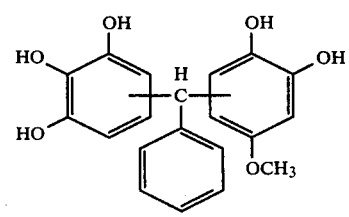

EXAMPLE 5

The same procedure as in Example 4 was carried out, except that salicylic acid was used in place of 4-methoxy pyrocatecol. The obtained product had the following formula:

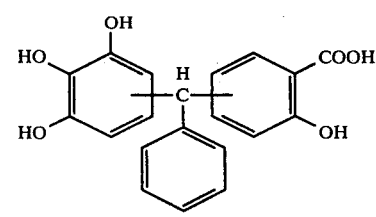

EXAMPLE 6

The inner surfaces and accessories of a stainless steel polymerization vessel of 1000 liter capacity was coated with the novel compound prepared in Example 1 after the compound was dissolved in acetone. The amounts coated onto the surfaces were 2.86 g/m$^2$, 0.98 g/m$^2$ and 0.05 g/m$^2$, respectively.

After evaporating the acetone completely, 200 kg of vinyl chloride, 450 kg of pure water, 180 g of a partially saponified polyvinyl acetate and 50 grams of azobis-dimethylvaleronitrile were charged into the polymerization vessel and polymerization reaction was carried out at 50° to 60° C. for 13 to 15 hours. After the end of the polymerization reaction, the obtained polymer was taken out from the vessel. It was observed that no trace of polymer scales adhered to the inner surfaces of the vessel and accessories, with the different amounts coated thereto.

Compared to the satisfactory results obtained using the inventive coating agent, when polymerization was carried out under the same conditions as mentioned above, but without using the inventive coating agent, 225 g/m² of polymer scales were found adhered to the inner surfaces of the vessel and accessories.

EXAMPLE 7

The same procedures as in Example 6 were carried out, except that the product of Example 4 was used in place of the product of Example 1. After the end of the polymerization reaction, the surfaces of the vessel and accessories were observed and no polymer scales were found; the metallic gloss of the surfaces remained.

EXAMPLE 8

The inner surfaces of a stainless steel polymerization vessel of 1000 liters, and various accessories used therewith, were coated with the product obtained in Example 2, after such product was dissolved in dimethyl formamide. The amount of coating was 1.20 g/m². After drying the coated layer, polymerization reaction was carried out in the same manner as in Example 6.

After the end of polymerization, the obtained polymer was taken out. There was no trace of polymer scales adhered to the surfaces of the vessel and accessories.

EXAMPLE 9

After coating the inner surfaces and accessories of a stainless steel polymerization vessel of 1000 liter capacity with an acetone solution of the product of Example 1, the solvent was expelled by drying. The amount of coating agent used was 1.12 g/m².

After charging 200 kg of vinyl chloride, 400 kg of pure water, 100 g of diisopropyl peroxydicarbonate, 1.8 kg of dodecylbenzenesulfonic acid sodium salt and 2.0 kg of cetyl alcohol were charged into the polymerization vessel and polymerization reaction was carried out at 45° C. for 8 hours. After the end of polymerization, the inner surfaces of the vessel and the accessories were examined. No trace of polymer scales was found.

When polymerization of vinyl chloride of the same recipe as above mentioned, was carried out without using the inventive coating agent, it was found that 380 g/m² of polymer scales adhered to the inner surfaces of the vessel.

EXAMPLE 10

After coating the inner surfaces of a stainless steel polymerization vessel of 1000 liter capacity and its accessories, with an acetone solution of the inventive coating agent obtained in Example 1, the solvent was completely expelled by drying. The amount of coating agent used was 2.12 g/m².

Then, after charging 450 kg of pure water, 900 g of sodium lauryl sulfate and 240 g of ammonium persulfate, 150 kg of vinyl chloride was added into the polymerization vessel and polymerization reaction was carried out at 55° C. for 11 hours. After the end of the polymerization reaction, the inside of the polymerization vessel and accessories were examined. No trace of polymer scales was found.

On the other hand, when polymerization was carried out under the same conditions as mentioned above, but without the use of the inventive coating agent, it was observed that there was 350 g/m² of adhered polymer scales on the walls of the vessel

EXAMPLE 11

After coating the inner surfaces of a stainless steel autoclave of 20 liter capacity, with an acetone solution of the inventive coating agent obtained in Example 1, the solvent was expelled by drying. The amount of coating agent used was 2.60 g/m².

Charging into the autoclave, 10 kg of vinyl chloride containing 0.03 weight percent of azobisisobutylonitrile, bulk polymerization reaction was carried out at 55° C. for 10 hours. After the end of the bulk polymerization, it was found that there was no trace of polymer scales on the surfaces of the vessel.

EXAMPLE 12

Onto the inner surfaces of a stainless steel polymerization vessel of 1000 liter capacity, a solution of each of the following coating agents dissolved in acetone, was coated, for separate polymerization scaling tests. The coating agents used were; for comparison, catechol, resorcinol, hydroquinone, pyrogallol, hydroxyhydroquinone, 1,3,5-trihydroxybenzene, and pyrogallic acid; and for the inventive coating agents, a condensation product of pyrogallol with formaldehyde as prepared in Example 3, a condensation product of pyrogallol with benzaldehyde as prepared in Example 1, and a condensation product of salicylic acid and pyrogallol with benzaldehyde as prepared in Example 5.

After each coating, the solvent was expelled by drying. Then 200 kg of vinyl chloride, 450 kg of pure water, 180 g of a partially saponified polyvinyl acetate and 50 g of azobis-dimethylvaleronitrile were charged into the polymerization vessel and polymerization was carried out at 56° C. for 13 to 15 hours. After the polymerization was completed, the resulting polymer was taken out, and the insides of the vessel were examined. The effects of the various coating agents on the prevention of polymer scaling were observed. The results are set forth hereinbelow in Table 1.

TABLE 1

| Coating agent | Amount of coating (g/m²) | Amount of Scales (g/m²) |
|---|---|---|
| Comparison agents | | |
| Blank (none used) | 0 | 250 |
| Catechol | 1.4 | 85 |
| Resorcinol | 1.1 | 235 |
| Hydroquinone | 1.3 | 270 |
| 1,3,5-tri-hydroxybenzene | 1.4 | 210 |
| Pyrogallic acid | 1.2 | 280 |
| Invention | | |
| Condensation product of pyrogallol and formaldehyde | 1.1 | 0 |
| Condensation product of pyrogallol and benzaldehyde | 1.0 | 0 |
| Condensation product of salicyclic acid and pyrogallol with benzaldehyde | 1.1 | 0 |

EXAMPLE 13

Onto the inner surface of a stainless steel polymerization vessel of 1000 liter capacity, a solution of each of the following coating agents dissolved in acetone, was coated for separate polymerization scaling tests. The coating agents used were (a) a condensation product of pyrogallol with formaldehyde, (b) a condensation product of pyrogallol with benzaldehyde, and (c) a condensation product of salicylic acid and pyrogallol with benzaldehyde. After each coating, the solvent was expelled by drying.

Then, 200 kg of vinyl chloride, 30 kg of vinyl acetate, 450 kg of pure water, 180 g of a partially saponified polyvinyl acetate and 50 g of azobis-dimethyl valeronitrile were charged into the polymerization vessel and polymerization was carried out at 50° to 60° C. for 12 hours. After the end of the polymerization reaction, the generated polymer was taken out and the inside of the polymerization vessel was examined. The effects of each coating agent on the prevention of polymer scales was observed. The results are shown in the following Table 2.

TABLE 2

| Coating agent | Amount of coating (g/m²) | Amount of scales (g/m²) |
|---|---|---|
| Blank (none used) | 0 | 290 |
| Condensation product of pyrogallol and formaldehyde | 1.7 | 0 |
| Condensation product of pyrogallol and benzaldehyde | 1.4 | 0 |
| Condensation product of salicylic acid and pyrogallol with benzaldehyde | 1.6 | 0 |

EXAMPLE 14

The inner surfaces of a stainless steel polymerization vessel of 1,000 liter capacity was coated with an acetone solution of each of the following coating agents, for separate polymerization scaling tests. The coating agents used in this example were pyrogallol, hydroxyhydroquinone, a condensation product of pyrogallol and formaldehyde, a condensation product of pyrogallol and benzaldehyde, and a condensation product of salicylic acid and pyrogallol with benzaldehyde.

Each of the polymerization tests was carried out just as in Example 13. However, in this example, the polymerization procedures were repeatedly carried out until the amount of adhere polymer scales exceeded 5 g/m² without a subsequent coating with the respective coating agent. The number of repeated polymerization charges possible on a single coating was found to be substantially different for the instant invention when compared to the coating used in the prior art, as shown below in Table 3.

TABLE 3

| Coating agent | Amount of coating (g/m²) | Number of polymerization runs before scales reached 5 g/m² (times) |
|---|---|---|
| comparison | | |
| Blank | 0 | 1 |
| Pyrogallol | 1.3 | 2 |
| Hydroxyhydroquinone | 1.2 | 2 |

TABLE 3-continued

| Coating agent | Amount of coating (g/m²) | Number of polymerization runs before scales reached 5 g/m² (times) |
|---|---|---|
| invention | | |
| Condensation product of pyrogallol and formaldehyde | 1.3 | More than 10 |
| Condensation product of pyrogallol and benzaldehyde | 1.2 | More than 20 |
| Condensation product of salicylic acid and pyrogallol and benzaldehyde | 1.2 | More than 10 |

The foregoing description is illustrative of the principles of the invention. Numerous variations and modifications thereof would be apparent to the worker skilled in the art. All such variations and modifications are to be considered to be within the spirit and scope of the invention.

What is claimed is:

1. A method of polymerizing vinyl chloride or a mixture of monomers comprising a major proportion of vinyl chloride with a minor proportion of other monomers copolymerizable therewith, in a polymerization vessel having accessories; wherein prior to polymerization, the surfaces of said polymerization vessel and accessories are coated with a compound consisting essentially of a condensation product of a phenolic compound having two or three OH groups, at least two of said OH groups located on adjacent carbon atoms of aromatic nucleus with an aromatic aldehyde; and wherein said phenolic compound is selected from the group consisting of pyrogallol, hydroxyhydroquinone, and mixtures thereof.

2. The method of claim 1, wherein said other monomers are selected from the group consisting of vinyl acetate, vinyl propionate, methyl vinyl ether, methyl acrylate, butyl acrylate, methyl methacrylate, maleic acid, fumaric acid, ethylene, propylene, vinylidene chloride, vinyl fluoride and acrylonitrile.

3. The method of claim 1, wherein the polymerization is by suspension polymerization.

4. The method of claim 1, wherein the polymerization is by emulsion polymerization.

5. The method of claim 1, wherein the polymerization is by bulk polymerization.

6. The method of claim 1, wherein said coating compound is dissolved in a solvent, diluted with a diluent or suspended in water prior to application to said surface.

7. The method of claim 1, wherein said coating compound is applied in amounts ranging from 0.001 g/m² to 5 g/m².

8. The method of claim 1, wherein said aromatic aldehyde is a member selected from the group consisting of aryl and aralkyl aldehyde having from 7 to 18 carbon atoms.

9. The method of claim 8, wherein said aromatic aldehyde is benzaldehyde.

10. The method of claim 1, wherein said compound is produced by a condensation reaction of (A) a phenolic compound having two or three OH groups on adjacent carbon atoms of aromatic nucleus and (B) aryl or substituted aryl compound having 6 to 18 carbon atoms with aromatic aldehyde.

* * * * *